US008641798B2

(12) United States Patent
Hight-Walker et al.

(10) Patent No.: US 8,641,798 B2
(45) Date of Patent: Feb. 4, 2014

(54) ONE-STEP SYNTHESIS OF MONODISPERSE AU-CU NANOCUBES

(75) Inventors: Angela R. Hight-Walker, Montgomery Village, MD (US); Yonglin Liu, Rockville, MD (US)

(73) Assignee: The United States of America, as represented by the Secretary of Commerce, NIST, Washington, DC (US)

( * ) Notice: Subject to any disclaimer, the term of this patent is extended or adjusted under 35 U.S.C. 154(b) by 140 days.

(21) Appl. No.: 13/181,110

(22) Filed: Jul. 12, 2011

(65) Prior Publication Data

US 2011/0283834 A1   Nov. 24, 2011

Related U.S. Application Data

(60) Provisional application No. 61/363,663, filed on Jul. 12, 2010.

(51) Int. Cl.
  *B22F 9/24* (2006.01)
  *B82Y 40/00* (2011.01)

(52) U.S. Cl.
  USPC ............... 75/351; 75/371; 977/810; 977/896

(58) Field of Classification Search
  None
  See application file for complete search history.

(56) References Cited

U.S. PATENT DOCUMENTS

| | | | | |
|---|---|---|---|---|
| 7,538,062 | B1* | 5/2009 | Dai et al. | 502/185 |
| 2005/0056118 | A1* | 3/2005 | Xia et al. | 75/330 |
| 2005/0215689 | A1* | 9/2005 | Garbar et al. | 524/440 |
| 2007/0034052 | A1* | 2/2007 | Vanheusden et al. | 75/362 |
| 2007/0207335 | A1* | 9/2007 | Karandikar et al. | 428/560 |

* cited by examiner

*Primary Examiner* — George Wyszomierski
(74) *Attorney, Agent, or Firm* — Daphne L. Burton; Burton IP Law Group

(57) ABSTRACT

A one-step process for synthesizing gold-copper bimetallic nanocubes. The process comprises the step of simultaneously reducing a copper II salt and a gold halide by 1,2-hexadecanediol in diphenyl ether, and 1-dodecanethiol as well as surfactants 1-adamantanecarboxylic acid and 1-hexadecylamine. The copper II salt may be copper (II) acetylacetonate, copper chloride, copper sulfate, or copper phosphate. The gold halide may be chloroauric acid, gold chloride, gold bromide, or tetrabromoauric acid. The reduction may occur at a temperature between about 160 and 180 degrees Celsius. The copper II salt may be copper (II) acetylacetonate and the gold halide may be chloroauric acid.

12 Claims, 12 Drawing Sheets

ONE-STEP SYNTHESIS OF MONODISPERSE AU-CU NANOCUBES

CROSS-REFERENCE TO RELATED APPLICATIONS

The present application claims priority to provisional application Ser. No. 61/363,663, filed on or about Jul. 12, 2010, entitled "One-Step Synthesis of Monodisperse Au—Cu Nanocubes" naming the same inventors as in the present application. The contents of this provisional application are incorporated by reference, the same as if fully set forth.

STATEMENT REGARDING FEDERALLY SPONSORED RESEARCH/DEVELOPMENT

The subject matter of this patent application was invented by employees of the United States Government. Accordingly, the United States Government may manufacture and use the invention for governmental purposes without the payment of any royalties.

BACKGROUND OF THE INVENTION

1. Field of Invention.

The present disclosure relates to production of gold-copper nanocubes and, more particularly, to a one-step formation process for substantially monodisperse gold-copper nanocubes.

2. Description of Related Art.

Multiple applications may be facilitated by gold and gold-containing alloy nanocrystals (NCs) with cubic morphologies because such nanocrystals have extraordinary crystalline and plasmonic properties. For instance, biomedical applications may be facilitated by cubic gold or gold-silver alloy nanocages. These nanocages may be promising candidates for photocatalysis as nanoreactors. Monodisperse cubic nanocrystals may also be used as building blocks for self-assembly. This is a significant step toward controlled design of novel nanostructure materials and devices.

Gold nanocubes may be produced using a number of methods and techniques, including but not limited to, seed-mediated methods, electrochemical techniques and polyol methods. On the other hand, production methods and techniques for gold-containing alloy nanocubes with cubic morphologies have been essentially limited to galvanic replacement reactions.

In order to fully realize the above-referenced applications, a facile, reliable synthetic protocol, may be useful particularly where it has better productivity, monodispersity, and perfection of cube and size control. In addition, while sub-10 nanometer nanocubes may have exhibited significant improvements of activity and selectivity compared to their larger counterparts, the prior art does not appear to include sub-10 nanometer gold or gold-containing nanocubes with cubic morphologies produced in solution conditions. This is possibly attributable to the fact that shape-control of nanocubes is a kinetically-controlled process as opposed to a thermodynamically-controlled process. Therefore, shape changes may result where adjustments are made to any synthetic parameter to reduce the size.

Nanoparticles can come in a different of different shapes, including but not limited to spheres, plates, rods, cubes. However, cubes with sharp edges have been shown to have broad-ranging applications. Accordingly, shape control of nanocubes is desired. There is a need for shape control of nano-objects.

Plus, gold has a large average surface self-diffusion distance of 3-12 nanometers. Because of this, recent prior art e.g., studies by Haick and others suggest that, it is unlikely to produce gold nanocubes with less than 25-27 nanometer edge sizes in a solution condition.

There is a need for gold-containing nanocubes with smaller edge sizes.

BRIEF SUMMARY OF DISCLOSURE

The present disclosure addresses the needs described above by alloying gold with other metals such as copper. In accordance with one embodiment of the present disclosure, a one-step process is provided for synthesizing gold-copper bimetallic nanocubes. The process comprises the step of simultaneously reducing a copper II salt and a gold halide by 1,2-hexadecanediol in diphenyl ether, and 1-dodecanethiol with surfactants 1-adamantanecarboxylic acid and 1-hexadecylamine. Gold halide may be presented as chloroauric acid, gold chloride, gold bromide, gold iodide, and tetrabromoauric acid.

These, as well as other objects, features and benefits will now become clear from a review of the following detailed description of illustrative embodiments and the accompanying drawings.

DETAILED DESCRIPTION OF THE DISCLOSURE

The present disclosure provides a one-step process for synthesizing gold-copper bimetallic nanocubes.

The physiochemical properties of nanocubes may be determined, and thus tuned by, their size, shape and composition, among other parameters. By way of example, cubic nanocubes may have a significant advantage over spherical nanocubes in terms of self-assembly, repeatable hot spots for surface-enhanced Raman scattering and other applications.

Bimetallic gold-copper alloy nanocubes with tunable sizes and compositions may provide wider control over their plasmon properties than single metallic nanocubes. The ability to engineer size, morphology, and composition may also be of great interest to those concerned with nano environmental, health and safety issues because isolation of these parameters before toxicological testing may be necessary to comprehend their actual effect. Therefore, the synthesis of bimetallic nanocubes such as gold-copper nanocubes, with controllable edge sizes (especially those with sub-10 nanometer edge sizes) may be of practical use.

However, because of complications associated with the solution phase and the tendency of self-purification, the growth of bimetallic nanocubes such as gold-copper nanocubes may be more difficult.

According to the prior art, gold-copper bimetallic nanoparticles may be produced without morphological control. For example, rod-shaped gold-copper nanocubes may be produced following a seed-mediated protocol. However, gold-copper bimetallic nanocubes are either not prevalent or not shown in the prior art.

The present disclosure provides a facile, one-step colloidal polyol method for the synthesis of uniform, single-crystalline gold-copper nanocubes with controllable edge size and composition. The gold-copper nanocubes of the present disclosure may be synthesized by simultaneous reduction of copper (II) acetylacetonate ($Cu(acac)_2$) and gold chloride ($HAuCl_4$) by 1,2-hexadecanediol (HDD) in diphenyl ether (DPE) as solvent, and 1-dodecanethiol (DDT) and surfactants 1-adamantanecarboxylic acid (ACA), 1-hexadecylamine (HDA).

More broadly, the gold-copper nanocubes of the present disclosure may be formed by simultaneously reducing a copper II salt and a gold halide. The type of copper (II) salt may be copper acetylacetonate ($Cu(acac)_2$) copper chloride ($CuCl_2$), copper sulfate ($CuSO_4$) or copper phosphate ($Cu_3(PO_4)_2$). The gold halide may be chloroauric acid ($HAuCl_4$), gold chloride (AuCl), gold bromide (AuBr), gold iodide (AuI), or tetrabromoauric acid ($HAuBr_4$).

Also part of the reducing solution may be by 1,2-hexadecanediol (HDD) and 1-dodecanethiol (DDT) in diphenyl ether. The solution may also contain surfactants 1-adamantanecarboxylic acid (ACA) and 1-hexadecylamine (HDA).

Figure 1A:
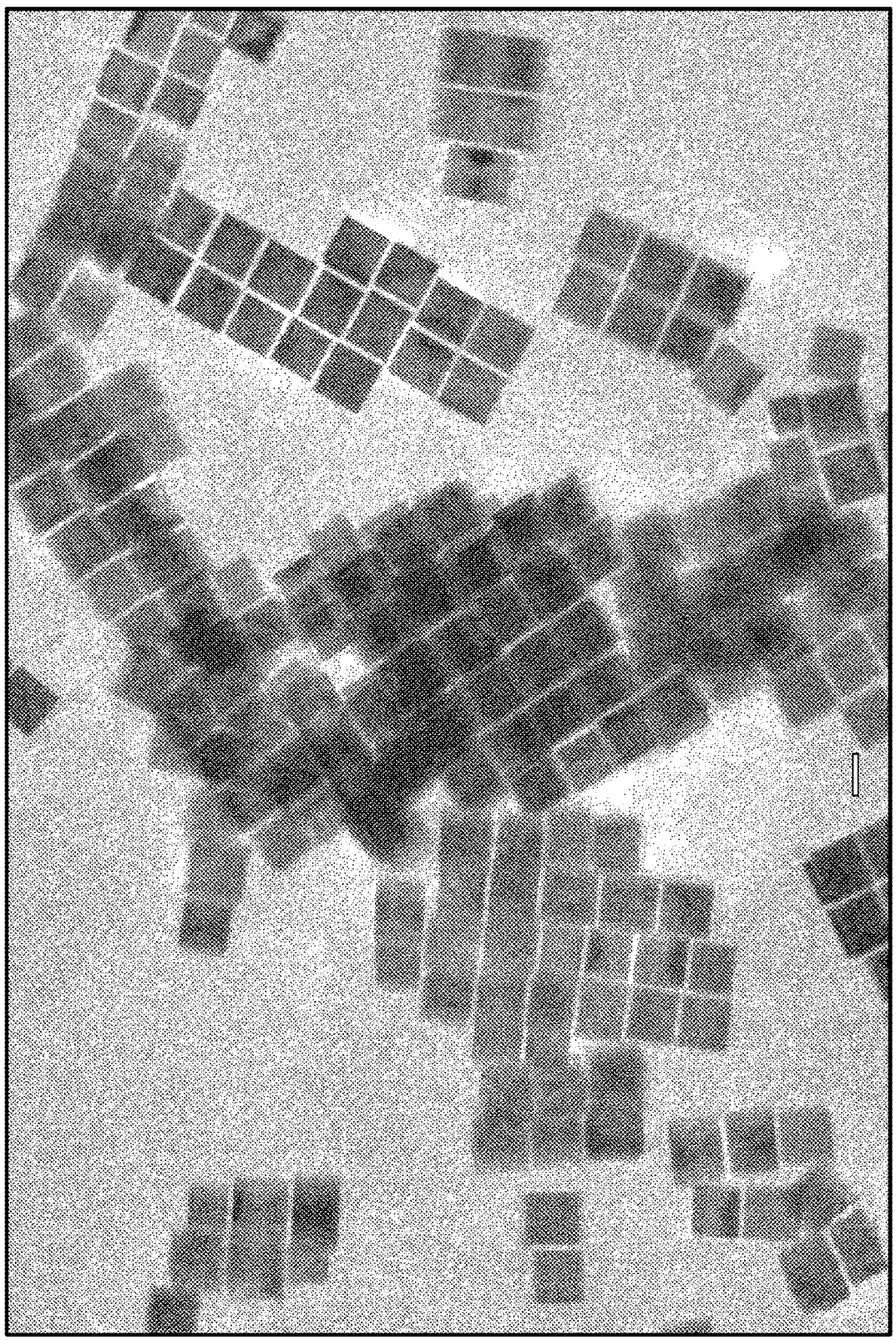
FIG. 1a is a typical transmission electron microscopy (TEM) image of the nanocubes of the present disclosure.
Figure 1B:
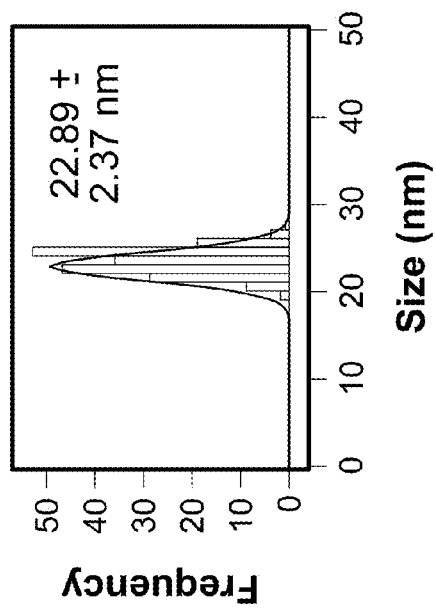
FIG. 1b is a graphical illustration of histogram showing how the particles of the image of FIG. 1a may be substantially perfectly cubic in shape and substantially uniform in size in accordance with one embodiment of the present disclosure.

Referring now to FIG. 1a, illustrated is a typical TEM image of nanocubes produced according to the one-step synthesis process described hereinabove. Referring now to FIG. 1b, as prepared, the nanoparticles may be substantially perfectly cubic in shape and substantially uniform in size. The particles may be quite small and may average 22.9 nm±2.4 nm in size. The nanocubes in FIG. 1b may be achieved by high-speed centrifuging, e.g., 16,000 revolutions per minute (rpm), without the size separation process of nanoparticles required and discussed in some prior art. The reaction may be conducted at about 180° Celsius with a molar ratio of $HAuCl_4$ to $Cu(acac)_2$ to DDT at 1:3:25. (In some instances, the reaction temperature may be as low as about 160° Celsius.) Substantially monodisperse gold-copper nanocubes may be produced during this polyol process.

Figure 1D:
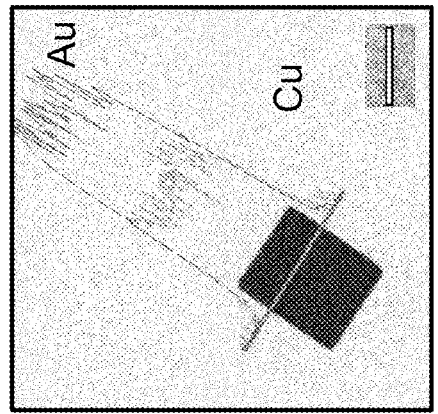
FIG. 1d is a scanning TEM (STEM) image and the corresponding energy dispersive X-ray (EDX) spectra following a line-scanning profile of a single nanocube indicating that the subject nanocubes are a homogeneous gold-copper alloy in accordance with one embodiment of the present disclosure.
Figure 1C:
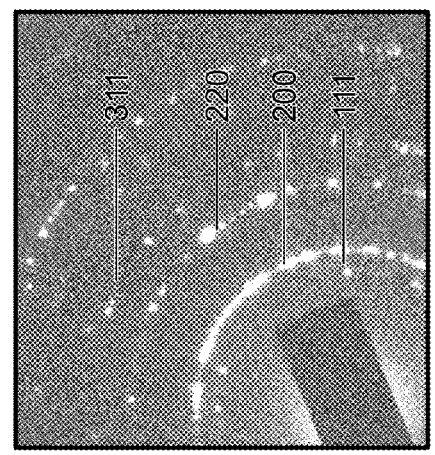
FIG. 1c is an illustration of a transmission electron microscopy (TEM) diffraction pattern showing a face-centered cubic structure that is consistent with a single-phase gold-copper alloy in accordance with one embodiment of the present disclosure.

Referring now to FIG. 1c, a TEM diffraction pattern may show a face-centered cubic structure that is consistent with a single-phase gold-copper alloy. Referring now to FIG. 1d, the STEM image and the corresponding EDX spectra following a line-scanning profile of a single nanocube may indicate that the nanocubes are a homogeneous gold-copper alloy without any segregation showing an approximate atomic ratio of three parts copper to one part gold. This ratio may be determined using the EDX analysis.

Figure 1F:
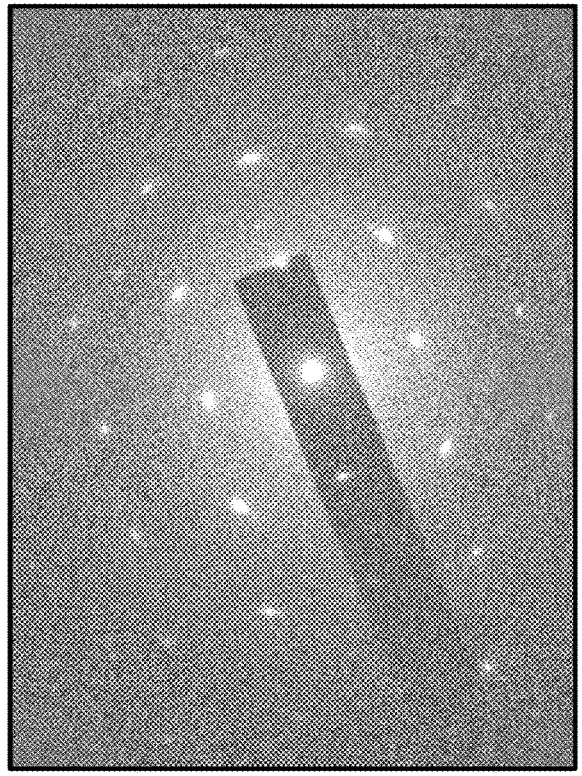
FIG. 1f is a selected-area electron diffraction (SAED) pattern of a single nanocube in accordance with one embodiment of the present disclosure.
Figure 1E:
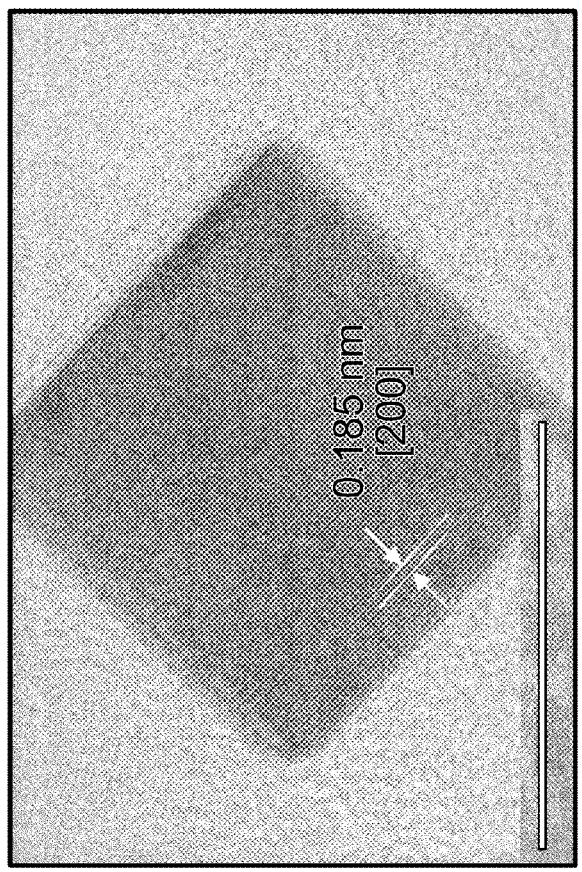
FIG. 1e is a high resolution TEM analysis of a typical nanocube of FIG. 1e in accordance with one embodiment of the present disclosure.

Referring now to FIGS. 1e and 1f, the high resolution TEM analysis of FIG. 1e and the selected-area electron diffraction pattern shown in FIG. 1f of a typical nanocube validate the single-crystalline nature of the as-prepared nanocubes. Referring back to FIG. 1e, the visible lattice fringes correspond to a spacing of 0.185 nm. This corresponds well to the expected d-spacing (0.187 nm) of the (200) plane of the $AuCu_3$ alloy. In the present illustration, the scale bars represent 20 nm.

Samples of the nanocubes may be withdrawn at various times of synthesis in a bid to better understand their formation process. Referring now to FIGS. 2a-2d, illustrated are TEM images of nanocube samples taken from the reaction solution at one hour, one and one-half hours, five hours and twenty-four hours, respectively.

Figure 2A:
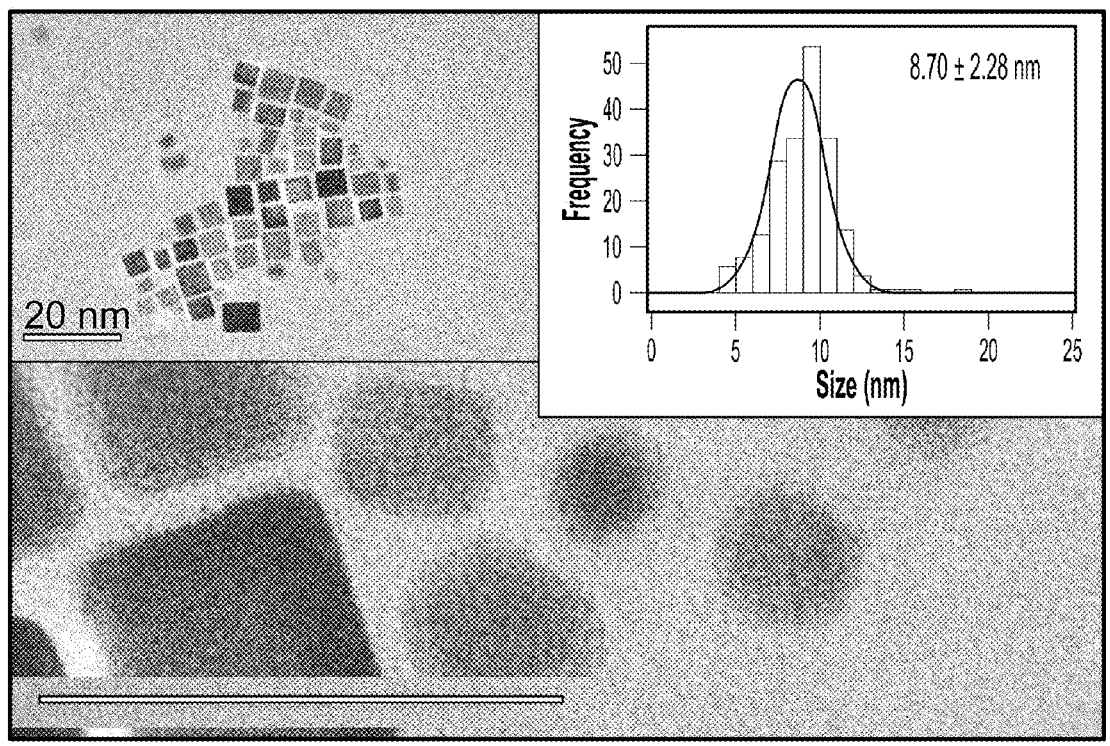
FIG. 2a illustrates gold-copper nanocubes and other nanostructures after one hour of reaction in accordance with one embodiment of the present disclosure.

As shown in FIG. 2a, at one hour, the gold-copper nanocubes may be observed along with cuboctahedral and polyhedral nanostructures. Undesirably, the nanocubes may be slightly truncated and have rounded edges. (Cubes with sharp edges may be more desirable.) These rounded-edged nanocubes may have an average size of 8.7 nm±2.3 nm. The average diameter of the cuboctahedral shape may be 6.7 nm±1.7 nm. Polyhedral nanostructures may be smaller, having an average size of 4 nm to 5 nm. Both the cuboctahedral and polyhedral nanocubes may be formed as intermediate stages during the formation process.

Figure 2B:
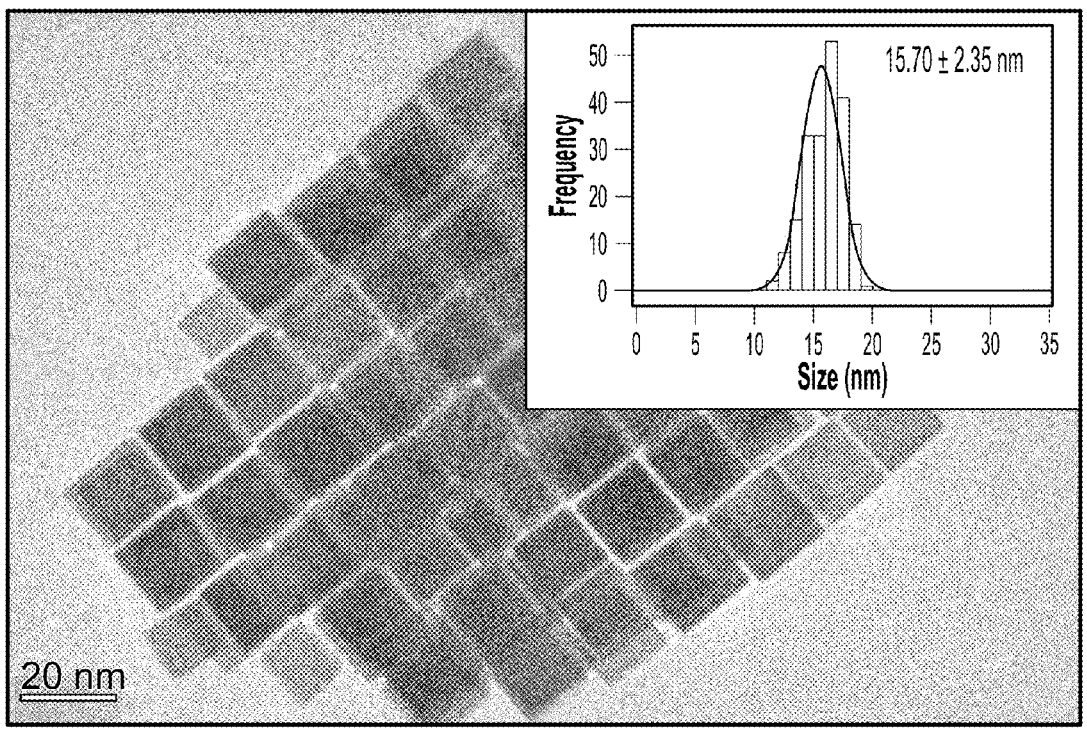
FIG. 2b illustrates gold copper nanocubes after one and one-half hours of reaction in accordance with one embodiment of the present disclosure.
Figure 2C:
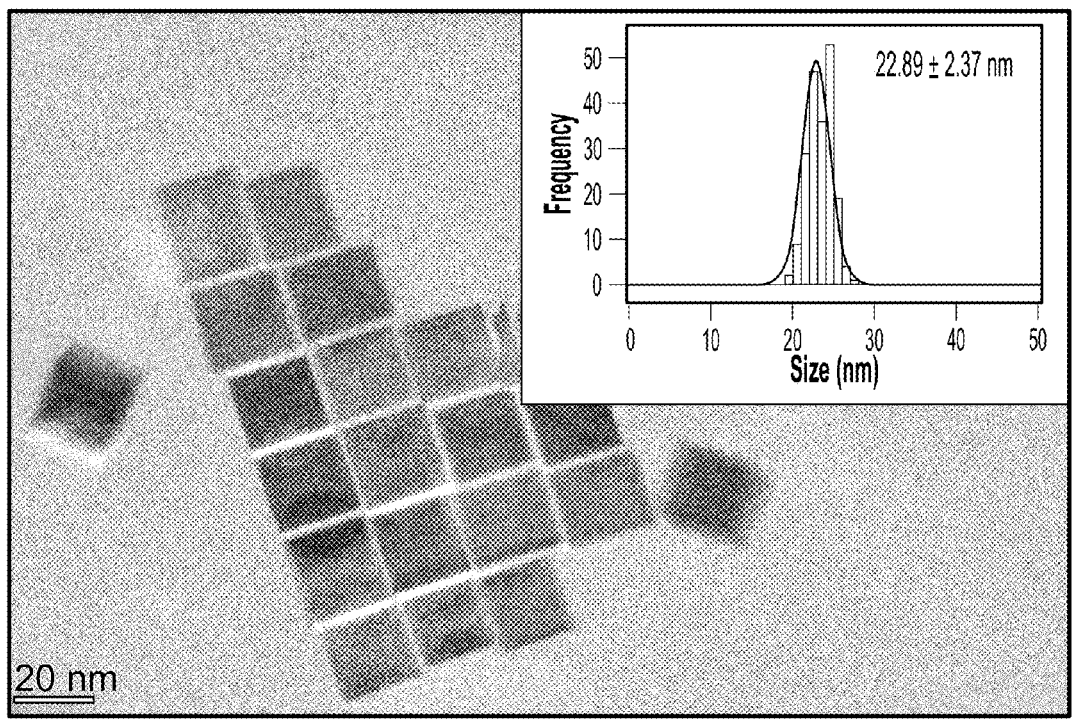
FIG. 2c illustrates gold copper nanocubes after five hours of reaction in accordance with one embodiment of the present disclosure.

As shown in FIG. 2b, at one and one-half hours, only nanocubes may be detected averaging 15.7 nm±2.4 nm. As shown in FIG. 2c, at five hours, only nanocubes may be detected at this time as well, averaging 22.9±2.4 nm. The five-hour nanocubes of FIG. 2c may have a narrower size distribution than those at one and one-half hours. Presumably, at the five-hour stage, the smaller nanocubes become larger with edge sharpening and size focusing by Ostwald ripening.

Figure 2D:
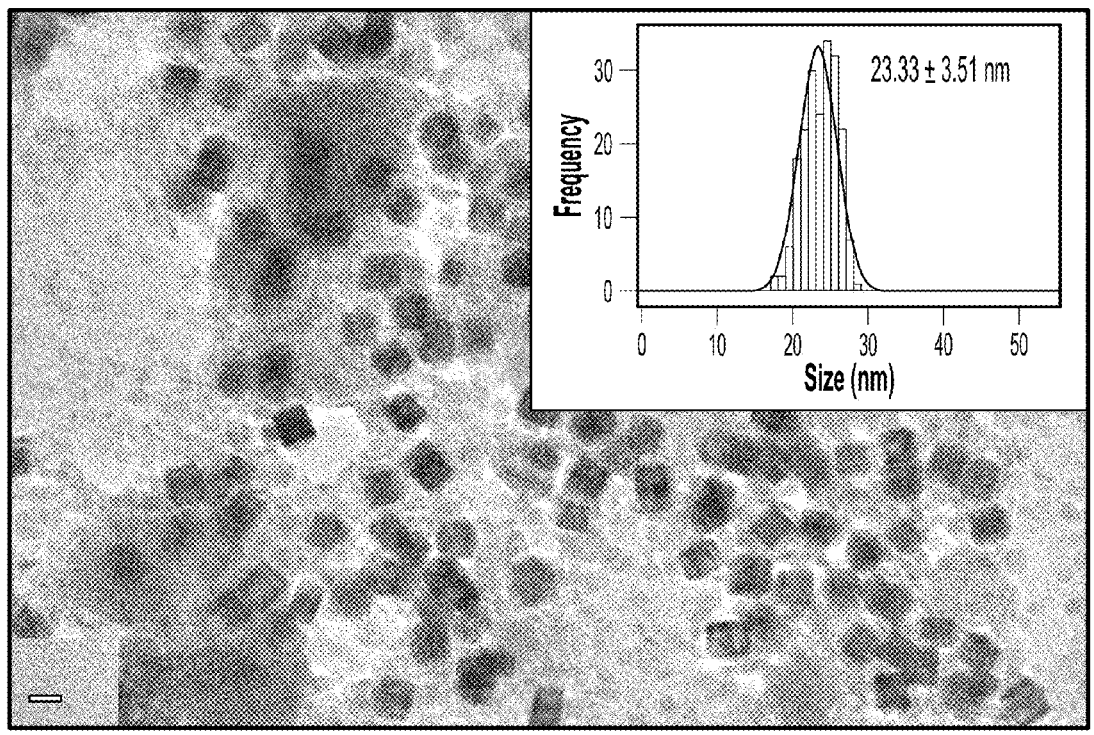
FIG. 2d illustrates gold-copper nanocubes and byproducts after twenty-four hours of reaction in accordance with one embodiment of the present disclosure.

As shown in FIG. 2d, at twenty-four hours, the nanocube sizes remain similar to those observed at five hours, thus demonstrating that the cube formation may be substantially complete at approximately five hours. The reactions associated with the illustrations of FIGS. 2a to 2d may be conducted at 180° Celsius with a molar ratio of $HAuCl_4$ to $Cu(acac)_2$ to DDT at 1:3:25.

Each component plays an important role in the synthetic protocol described herein. The process may begin with 1-dodecanethiol (DDT), copper (II) acetylacetonate, and gold chloride in the starting solution for the formation of gold-copper alloy nanocubes. The 1-dodecanethiol component may act as a co-reduction agent by accelerating the reduction rate of copper and decreasing that of gold.

This conclusion may be further supported by the different decomposition behaviors of copper or gold precursors. Without 1-dodecanethiol, copper (II) acetylacetonate may decompose into copper nanocubes after being heated at one hundred eighty degrees Celsius (180° C.) for twelve (12) hours, as gold chloride decomposes into gold nanocubes at eighty degrees Celsius (80° C.). By comparison, gold-copper nanocubes may start to form within one hour at hundred eighty degrees Celsius (180° C.) in the presence of DDT.

DDT may also perform an important role in the morphology control of nanocubes. For example, without DDT, multiple twinned nanocubes with small numbers (e.g., five percent) of truncated nanocubes may be observed. On the other hand, without copper (II) acetylacetonate, gold nanoparticles may be formed with irregular shapes. The reaction of a molar 1:10 ratio of copper (II) acetylacetonate to gold chloride may produce nanocubes having a size of 5 nm to 50 nm and also having bigger branched nanostructures, presumably generated from the aggregation of small nanocubes with insufficient surface protection. The reaction of a molar 12:1 ratio of copper (II) acetylacetonate to gold chloride may form nanocubes solely within a range of 2 nm to 20 nm. Based on this observation, one conclusion may be that copper (II) acetylacetonate is not only one of the reactants, but also an important surface protecting agent for nanocubes. It may be shown that the reaction using copper chloride instead of copper (II) acetylacetonate may also produce nanocubes, suggesting that the acetylacetonate group does not play an effective role. On the other hand, it appears that gold chloride plays an important role.

Figure 3A:
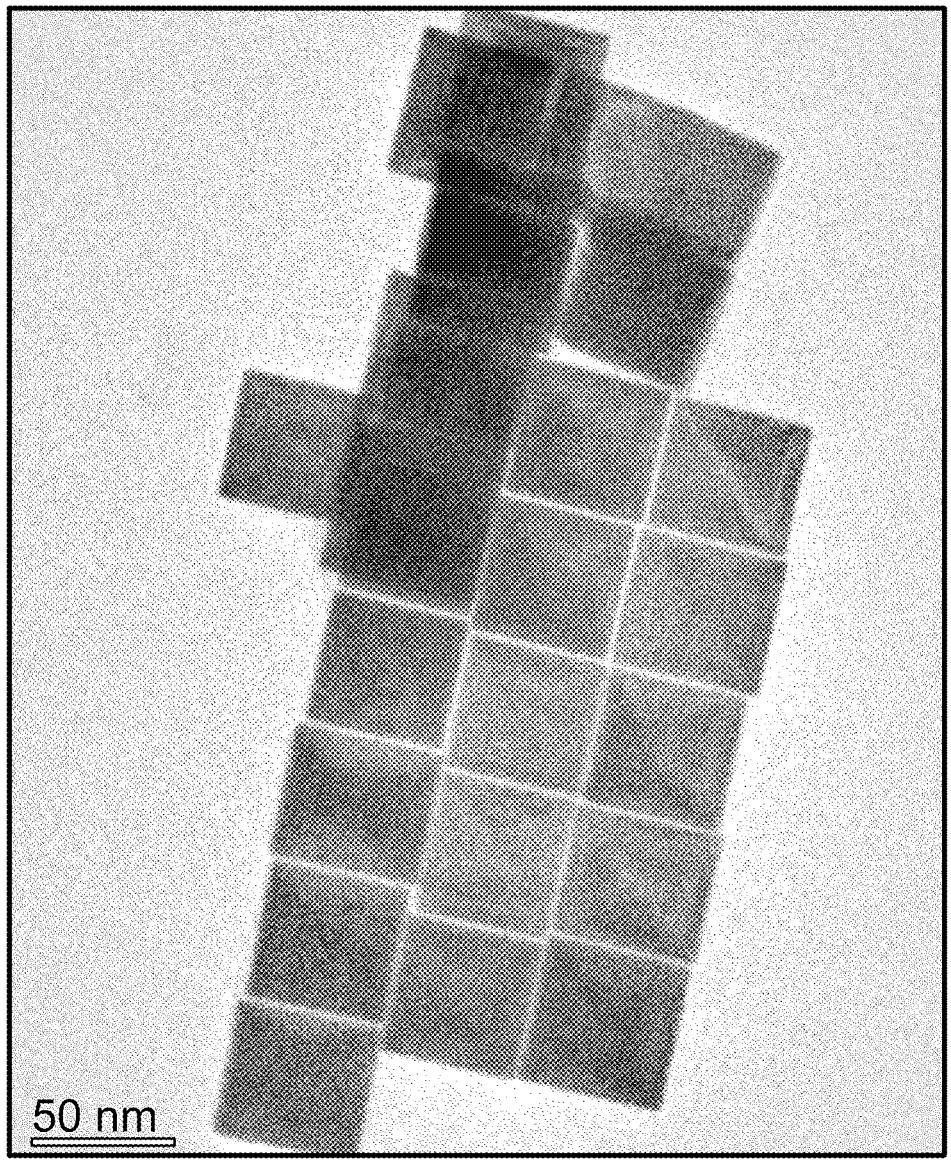
FIG. 3a is a scanning electron micrograph—illustration of nanocubes in accordance with one embodiment of the present disclosure.
Figure 3B:
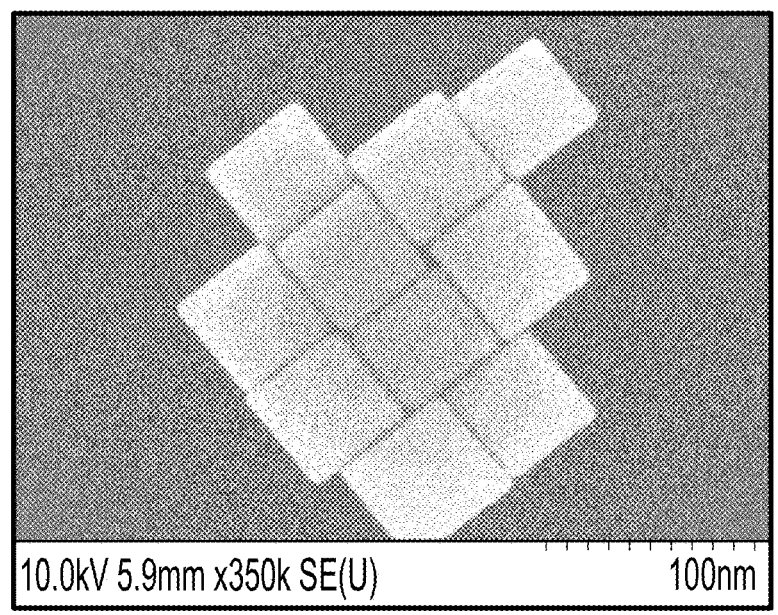
FIG. 3b transmission electron micrograph illustration of nanocubes in accordance with one embodiment of the present disclosure.
Figure 3C:
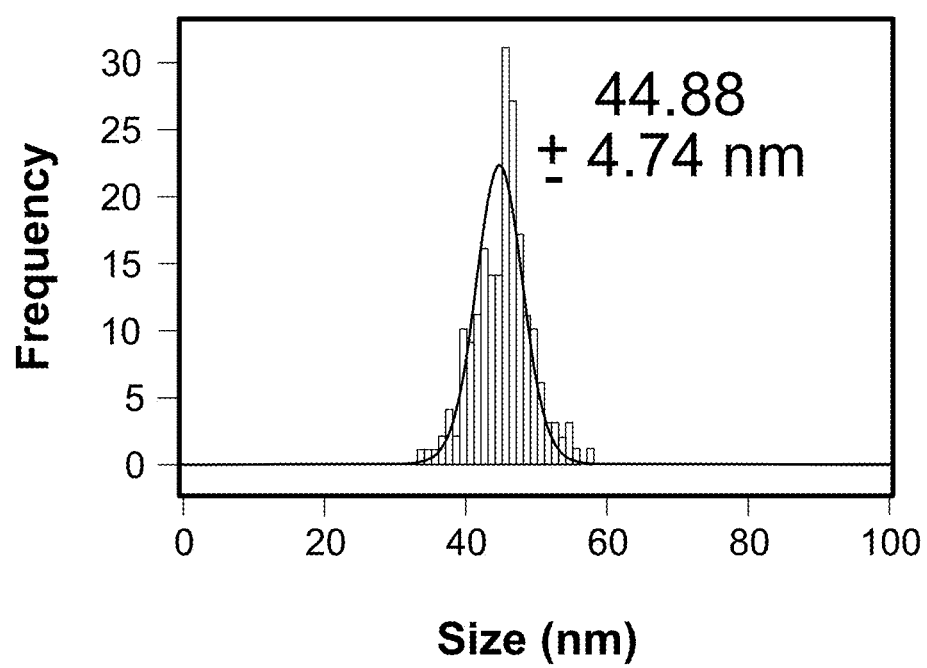
FIG. 3c is a histogram showing 200 measurements of the as-prepared nanocubes.

In order to rationally control the edge size of the gold-copper nanocubes, the composition amounts of DDT, copper (II) acetylacetonate and gold-chloride may be varied in the starting solution. Referring now to FIGS. 3a and 3b, if the amounts of DDT and gold chloride are kept constant at 0.5 mL and 26 mg, respectively, and copper (II) acetylacetonate is increased to 98 mg, gold-copper nanocubes with a size of about 45 nm may be produced. FIG. 3a illustrates a scanning electron micrograph. FIG. 3b illustrates a transmission electron microscopy. These perfect nanocubes may be monodispersed, with an average size of about 44.9±4.7 nm—in other words, about 45 nm.

Figure 3E:
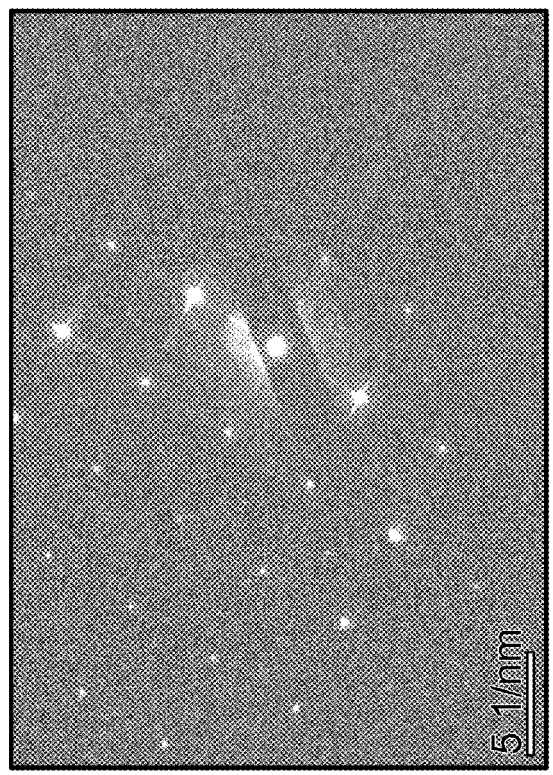
FIG. 3e is an SAED pattern of a single nanocube in accordance with one embodiment of the present disclosure.
Figure 3D:
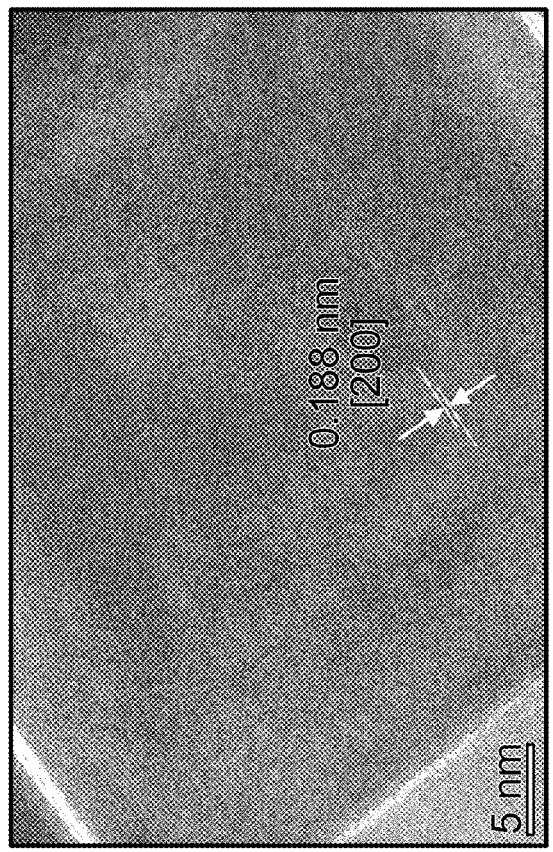
FIG. 3d is a high-resolution TEM image of a typical cube in accordance with one embodiment of the present disclosure.

Referring now to FIG. 3d, a high-resolution TEM image of a typical cube shows that they are single-crystalline, with the inter-fringe distance being about 0.188 nm, close to the (200) planes at 0.187 nm in the face centered cubic gold-copper alloy crystal. As shown in FIG. 3e, this conclusion is supported as well. Gold-copper nanocubes in the range of 85 nm may be formed by adding 130 mg of copper (II) acetylacetonate. The reactions associated with the illustrations of FIGS. 3a to 3e may be conducted at 180° Celsius with a molar ratio of $HAuCl_4$ to $Cu(acac)_2$ to DDT at 1:5:25. It should also be noted that other molar ratios can be used to produce nanocubes with different parameters, such as size. For example, the molar ratio of $HAuCl_4$ to $Cu(acac)_2$ to DDT may be 1:3:25 or 1:5:25, among other suitable ratios.

Producing monodisperse nanocubes with sub-10 nm edge sizes has been seen as challenging in the prior art. However, it may be easily achieved by decreasing the amount of copper (II) acetylacetonate and DDT in the starting solution. By using, e.g., 26 mg of gold chloride, 8 mg of copper (II) acetylacetonate and 0.1 mL of DDT, gold-copper nanocubes of sub-10 nm may be produced.

Figure 4B:
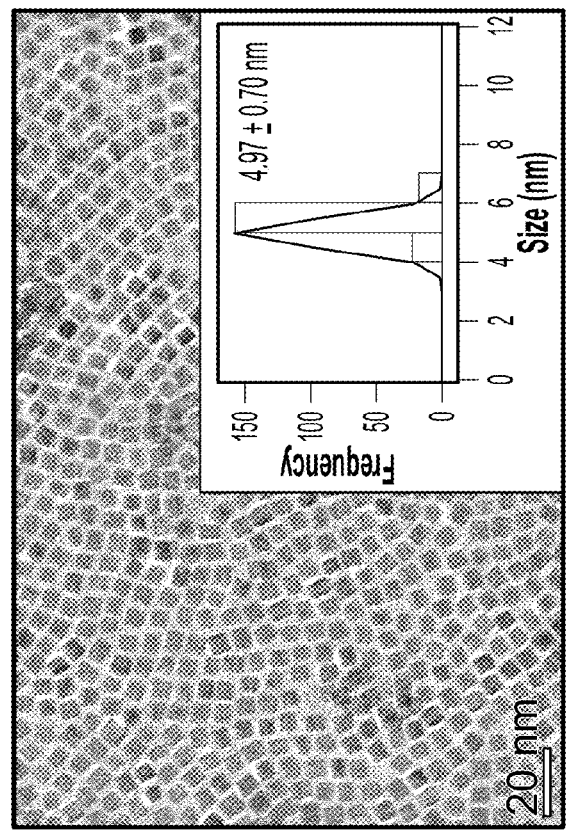
FIG. 4b illustrates a TEM diffraction pattern of as-prepared nanocubes in accordance with one embodiment of the present disclosure.
Figure 4A:
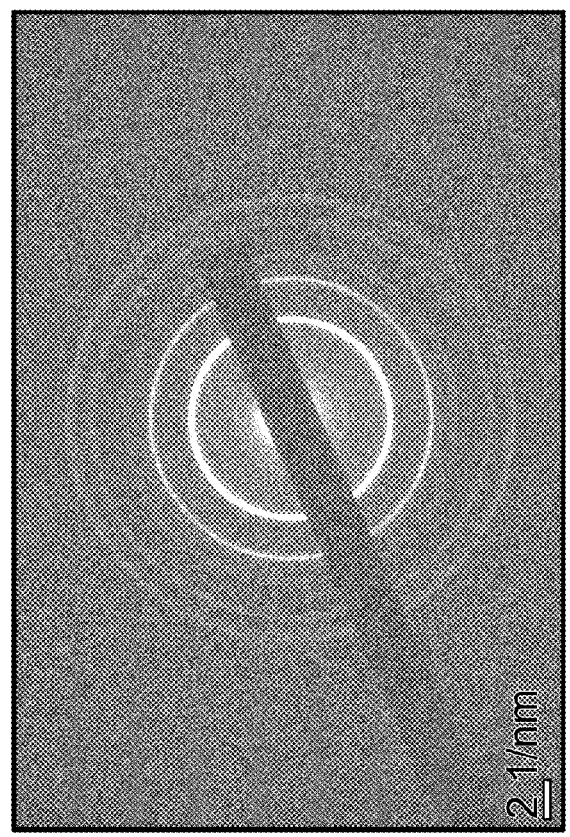
FIG. 4a is a TEM image of nanocubes measuring approximately 5 nm in accordance with one embodiment of the present disclosure. Inset: the histogram showing 200 measurements of the as-prepared nanocubes.

Referring now to FIG. 4a, the as-prepared nanocubes may be exclusively and perfectly cubic, and have a uniform edge length of about 5 nm (give or take about 0.7 nm). It is difficult, if not impossible, to find such edge lengths in the prior art. The reactions associated with the illustrations of FIGS. 4a to 4e may be conducted at 180° Celsius with a molar ratio of $HAuCl_4$ to $Cu(acac)_2$ to DDT at 1:0.4:5.

Each nanocube may be composed of a face centered cubic alloy of gold copper ($AuCu_3$) and may be single-crystalline bounded by (200) facets. This may be shown using the TEM diffraction pattern shown in FIG. 4b. The alloy $Au_3Cu$ may look the same as $AuCu_3$. However, the two can be distinguished by looking further to FIG. 4c.

Figure 4D:
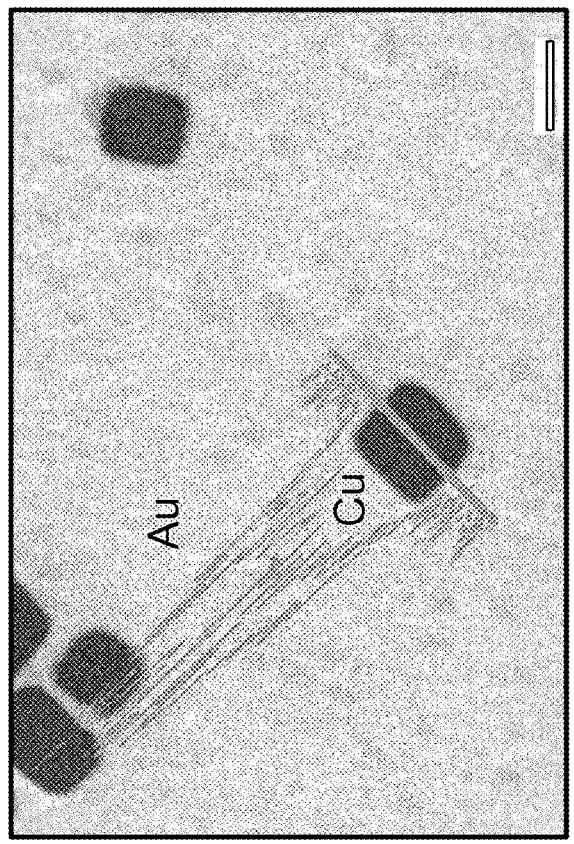
FIG. 4d illustrates an STEM image and the corresponding EDX spectra following a line-scanning profile of a single nanocube in accordance with one embodiment of the present disclosure.
Figure 4C:
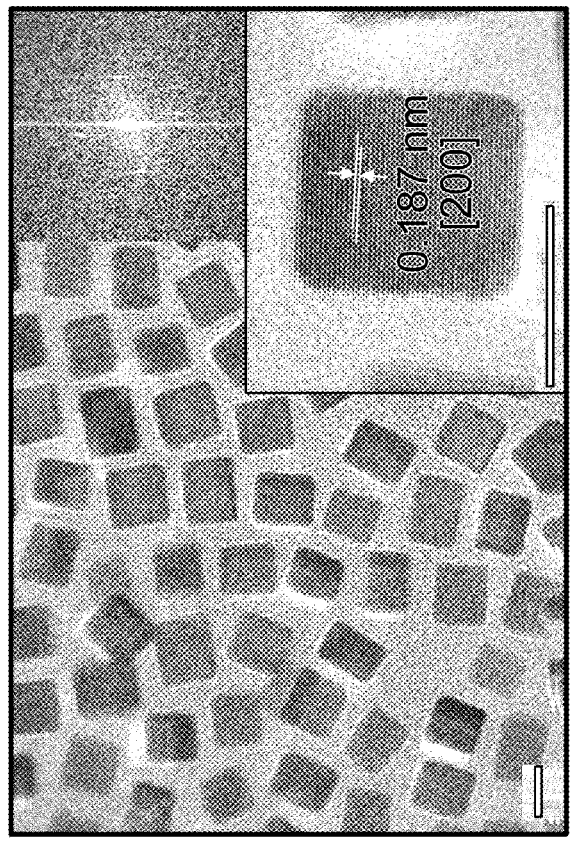
FIG. 4c illustrates a high-resolution TEM image of as-prepared nanocubes in accordance with one embodiment of the present disclosure. Inset: the high-resolution TEM image of a single nanocube (bottom) and its corresponding fast Fourier transform (FFT) pattern.

High resolution TEM imaging of one individual nanocube as shown in FIG. 4c and the corresponding fast Fourier transform pattern are shown in the inset of FIG. 4c. The composition of gold-copper alloy nanocubes may be further confirmed by scanning transmission electron microscopy of one nanocube along with energy dispersive X-ray spectroscopy (EDX) line profiling analysis as shown in FIG. 4d. As shown, there is a homogeneous distribution of copper and gold across the entire nanocube.

The formation reaction of about 5 nm nanocubes may happen more quickly than for those of about 23 nm. The former might occur at 20 minutes while the latter may occur at 5 hours. This suggests a kinetically controlled process.

Also, the amount of chloroauric acid ($HAuCl_4$) may play an important role in the production of monodisperse 5 nm nanocubes. Nanocubes with various morphologies and size distributions may be formed through a control reaction by reducing the amount of $HAuCl_4$ to 4 mg. The excess $HAuCl_4$ or gold chloride (AuCl) may play at least two important roles during the formation of the nanocubes of about 5 nm in size. The excess $HAuCl_4$ or gold chloride (AuCl) may not only act as a surface protecting agent for the 5 nm nanocubes, it may also restrict the formation of non-cubic nanocubes. It may be desirable not to further decrease the amount of copper (II) acetylacetonate. When the ratio of gold hydrochloride to copper (II) acetylacetonate is significantly decreased, branched nanostructures larger than 500 nm may appear with small amounts of nanocubes. The branched nanostructures may be formed by the aggregation of small nanocubes without enough surface stabilization by $Cu^{2+}$ ions.

In addition to DDT, copper (II) acetylacetonate and gold chloride, the formation of monodisperse nanocubes may also depend on HDD. Long carbon-chained diols may act as a mild reducing agent and assist the nucleation process. Without HDD, nanocrystal formation after 5-10 hours may not occur. The length of the chain in the diol may also play an important role during nanocube formation. The reaction using hexanediol may not led to the formation of nanoparticles, while using 1,2-dodecanediol (DDD) instead of HDD may lead to the formation of branched nanocubes with only 5% of nanocubes. This suggests that HDD, which has a carbon length chain that matches HDA may also act as a surface-protecting agent during the formation of monodisperse nanocubes. Some prior art has reported that under relatively low concentration of HDD, bimetallic nimrods or octapod nanostructures may be produced. However, if the concentration of HDD was decreased five times of the study of its effect on the resulting shapes of gold-copper nanocubes, nanocubes with even smaller sizes may be obtained instead of nanorods and octapods. The monodisperse single-crystalline nanocubes, having an average size of about 3.4 nm±0.6 nm, may be further assigned to $AuCu_3$ face centered cubic alloy on the basis of high resolution TEM analysis and TEM diffraction pattern. One-step production of perfect gold-copper nanocubes with sub-10 nm sizes result. In addition, nanocubes of about 3.4 nm may have a number of valuable uses. For example, for cathalysis, the smaller nanocubes may be more reactive than bigger ones.

ACA may play an important role in forming the sharpness of the nanocubes, while HDA may be an important factor in maintaining the uniformity of the nanocubes. Argon purge may not be necessary for formation of nanocubes and polar solvents favor nanocube formation, likely due to charged surfaces by $Cu^{2+}$.

The unique one-step process described in the present disclosure combines size controllable nanocubes with the nature of the gold-copper alloy to enable further adjustment of the composition while maintaining cubic morphologies. For example, nanocubes of 5 nm may be produced using a starting solution having 100 mg of gold chloride, 65 mg of copper (II) acetylacetonate and 0.5 mL of DDT. The composition of these nanocubes, however, is determined as a face centered cubic crystalline $Au_3Cu$ alloys on the basis of TEM diffraction pattern, high resolution TEM imaging, fast Fourier Transform pattern of a single cube and EDX analysis. In addition, the sizes of $Au_3Cu$ nanocubes may be further adjusted, e.g., by decreasing the amount of gold hydrochloride to 85 mg while maintaining the DDT at 0.5 mL and copper (II) acetylacetonate at 65 mg. Using this starting solution, $Au_3Cu$ nanocubes of 12 nm may be observed.

A one-pot polyol process for the synthesis of gold-copper bimetallic nanocubes is described herein. When the reaction parameters are adjusted, the edge length of the nanocubes may be controlled through 3.4 nm, 5 nm, 12, 23 nm, 45 nm and 85 nm. The composition can be varied from $AuCu_3$ to $Au_3Cu$.

While the specification describes particular embodiments of the present invention, those of ordinary skill can devise variations of the present invention without departing from the inventive concept.

We claim:

1. A one-step process for synthesizing gold-copper bimetallic nanocubes, the process comprising the step of:
    simultaneously reducing a copper II salt and a gold halide by 1,2-hexadecanediol in diphenyl ether, 1-adamantanecarboxylic acid, 1-hexadecylamine, and 1-dodecanethiol.

2. The process of claim 1, wherein the copper II salt is copper (II) acetylacetonate, copper chloride, copper sulfate, or copper phosphate.

3. The process of claim 1, wherein the gold halide is chloroauric acid, gold chloride, gold bromide, or tetrabromoauric acid.

4. The process of claim 1, wherein the reduction occurs at a temperature between about 160 and about 180 degrees Celsius.

5. The process of claim 1, wherein the copper II salt is copper (II) acetylacetonate and the gold halide is chloroauric acid; and
    wherein the molar ratio of chloroauric acid to copper (II) acetylacetonate to 1-dodecanethiol is about 1:3:25.

6. The process of claim 5, wherein a reaction time is about one hour, about 1.5 hours, about 5 hours or about 24 hours.

7. The process of claim 1, wherein the copper II salt is copper (II) acetylacetonate and the gold halide is chloroauric acid; and
    wherein the molar ratio of chloroauric acid to copper (II) acetylacetonate to 1-dodecanethiol is about 1:5:25.

8. The process of claim 1, wherein the copper II salt is copper (II) acetylacetonate and the gold halide is chloroauric acid; and
    wherein the molar ratio of chloroauric acid to copper (II) acetylacetonate to 1-dodecanethiol is about 1:0.4:5.

9. The process of claim 1, wherein the edge size of the resulting gold-copper bimetallic nanocubes is either about 3.4 nanometers, about 5 nanometers, about 12 nanometers, about 23 nanometers, about 45 nanometers or about 85 nanometers.

10. The process of claim 1, wherein the resulting gold-copper bimetallic nanocubes are composed of $Cu_3Au$ or $CuAu_3$.

11. The process of claim 1, wherein the copper II salt is copper (II) acetylacetonate and the gold halide is chloroauric acid; and
    wherein the molar ratio of chloroauric acid to copper (II) acetylacetonate to 1-dodecanethiol is about 3:3:25.

12. The process of claim 1, wherein the copper II salt is copper (II) acetylacetonate and the gold halide is chloroauric acid; and
    wherein the molar ratio of chloroauric acid to copper (II) acetylacetonate to 1-dodecanethiol is about 2.4:3:25.

* * * * *